(12) United States Patent
Farrand et al.

(10) Patent No.: US 9,908,963 B2
(45) Date of Patent: Mar. 6, 2018

(54) PARTICLES FOR ELECTROPHORETIC DISPLAYS

(71) Applicants: Merck Patent GmbH, Darmstadt (DE); University of Kent, Canterbury (GB)

(72) Inventors: Louise D. Farrand, Dorset (GB); Claire Topping, Southampton (GB); Kate Belsey, Birchington (GB); Simon Holder, Canterbury (GB)

(73) Assignee: Mereck Patent GmbH, Darmstadt (DE)

(*) Notice: Subject to any disclaimer, the term of this patent is extended or adjusted under 35 U.S.C. 154(b) by 205 days.

(21) Appl. No.: 14/783,971

(22) PCT Filed: Mar. 18, 2014

(86) PCT No.: PCT/EP2014/000738
§ 371 (c)(1),
(2) Date: Oct. 12, 2015

(87) PCT Pub. No.: WO2014/166583
PCT Pub. Date: Oct. 16, 2014

(65) Prior Publication Data
US 2016/0060379 A1  Mar. 3, 2016

(30) Foreign Application Priority Data
Apr. 12, 2013 (EP) ................. 13001925

(51) Int. Cl.
| C08F 287/00 | (2006.01) |
| C08F 299/04 | (2006.01) |
| C08F 265/06 | (2006.01) |
| C08F 293/00 | (2006.01) |
| G02F 1/167  | (2006.01) |

(52) U.S. Cl.
CPC .......... *C08F 299/04* (2013.01); *C08F 265/06* (2013.01); *C08F 287/00* (2013.01); *C08F 293/005* (2013.01); *G02F 2001/1678* (2013.01)

(58) Field of Classification Search
CPC ................. C08F 287/00; C08F 2220/1891
See application file for complete search history.

(56) References Cited

U.S. PATENT DOCUMENTS

| 4,613,559 A | 9/1986 | Ober et al. |
| 5,380,362 A | 1/1995 | Schubert |
| 5,403,518 A | 4/1995 | Schubert |
| 5,607,864 A | 3/1997 | Ricchiero et al. |
| 5,716,855 A | 2/1998 | Lerner et al. |
| 5,783,614 A | 7/1998 | Chen et al. |
| 6,194,488 B1 | 2/2001 | Chen et al. |
| 6,822,782 B2 | 11/2004 | Honeyman et al. |
| 6,956,690 B2 | 10/2005 | Yu et al. |
| 7,038,655 B2 | 5/2006 | Herb et al. |
| 7,052,766 B2 | 5/2006 | Zang et al. |
| 7,110,162 B2 | 9/2006 | Wu et al. |
| 7,170,670 B2 | 1/2007 | Webber |
| 7,226,550 B2 | 6/2007 | Hou et al. |
| 7,236,290 B1 | 6/2007 | Zhang et al. |
| 7,247,379 B2 | 7/2007 | Pullen et al. |
| 7,277,218 B2 | 10/2007 | Hwang et al. |
| 7,304,634 B2 | 12/2007 | Albert et al. |
| 2005/0267263 A1 | 12/2005 | Minami |
| 2007/0128352 A1 | 6/2007 | Honeyman et al. |
| 2007/0268244 A1 | 11/2007 | Chopra et al. |
| 2007/0297038 A1 | 12/2007 | Chopra et al. |
| 2008/0013156 A1 | 1/2008 | Whitesides et al. |
| 2012/0041165 A1* | 2/2012 | Greinert ............... C08F 220/14 526/257 |

FOREIGN PATENT DOCUMENTS

| EP | 1491941 A2 | 12/2004 |
| GB | 2438436 A | 11/2007 |
| WO | WO-99/10767 A1 | 3/1999 |
| WO | WO-2005017046 A2 | 2/2005 |
| WO | WO-2006126120 A1 | 11/2006 |
| WO | WO-2007048721 A1 | 5/2007 |
| WO | WO-2008003604 A2 | 1/2008 |
| WO | WO-2008003619 A2 | 1/2008 |
| WO | WO-2009100803 A2 | 8/2009 |
| WO | WO-2010019704 A1 | 2/2010 |
| WO | WO-2010089057 A2 | 8/2010 |

OTHER PUBLICATIONS

Harris, H., et al., "Octadecyl acrylate based block and random copolymers prepared by ATRP as comb-like stabilizers for colloidal micro-particle one-step synthesis in organic solvents", Polymer, vol. 47, No. 16, (2006), pp. 5701-5706.

International Search Report for PCT/EP2014/000738 dated Jun. 13, 2014.

Kim, T.H., et al., "Preparation and Characterization of Colored Electronic Ink Nanoparticles by High Temperature-Assisted Dyeing for Electrophoretic Displays", Journal of Nanoscience and Nanotechnology, vol. 6, No. 11, (2006), pp. 3450-3454.

Matyjaszewski, K., et al., "Nanostructured functional materials prepared by atom transfer radical polymerization", Nature Chemistry, vol. 1, (2009), pp. 276-288.

Tang, W., et al., "Understanding Atom Transfer Radical Polymerization: Effect of Ligand and Initiator Structures on the Equilibrium Constants", Journal of the American Chemical Society, vol. 130, (2008), pp. 10702-10713.

\* cited by examiner

*Primary Examiner* — Mark S Kaucher

(57) ABSTRACT

This invention relates to polymer particles, a process for their preparation, the use of these particles for the preparation of an electrophoretic device, electrophoretic displays comprising such particle, and new copolymer stabilizers.

14 Claims, No Drawings

1

PARTICLES FOR ELECTROPHORETIC DISPLAYS

CROSS-REFERENCE TO RELATED APPLICATIONS

This application is a national stage application (under 35 U.S.C. § 371) of PCT/EP2014/000738, filed Mar. 18, 2014, which claims benefit of European Application No. 13001925.0, filed Apr. 12, 2013, both of which are incorporated herein by reference in their entirety.

This invention relates to polymer particles, a process for their preparation, the use of these particles for the preparation of an electrophoretic device, colour electrophoretic displays comprising such particles, and new block copolymer stabilisers.

BACKGROUND OF THE INVENTION

In recent years a need has developed for low power, low cost and light weight display devices. EPDs (Electrophoretic Displays) can fulfil this requirement. One use of EPDs is for electronic paper. It is imperative that once an image is displayed, the image can be retained for a long period of time without further voltage being applied. Hence, this fulfils the requirements of low power use, and means an image can be visible until another image is required.

An EPD generally comprises charged electrophoretic particles dispersed between two substrates, each comprising one or more electrodes. The space between the electrodes is filled with a dispersion medium which may be a different colour to the colour of the particles. The space between the electrodes may also be filled with a transparent dispersion medium and two kinds of particles with charge of opposite signs. If a voltage is applied between the electrodes, charged particles move to the electrode of opposite polarity. The particles can cover the observer's side electrode, so that a colour identical to the colour of the particles is displayed when an image is observed from the observer's side. Any image can be observed using a multiplicity of pixels. Available technologies of EPDs include electronic paper, commercially used in electronic books. This application uses black and white colour. However, the main disadvantage of state of the art EPDs is the lack of a bright full colour system.

The use of different coloured particles in a single pixel has been exemplified in recent patent literature (U.S. Pat. No. 7,304,634, GB 2 438 436, US 2007/0268244), but all of these approaches require the use of complex cell structures and drive schemes. Special coloured particles for EPDs and processes for their preparation are disclosed in US 2007/0297038, US 2008/0013156, U.S. Pat. No. 6,822,782, WO 2007/048721, WO 2008/003619, WO 2008/003604, US 2005/0267263, WO 2006/126120, and J. Nanosci. Nanotechn. 2006, Vol. 6, No. 11, p. 3450-3454. Two particle system comprising inorganic and resin particles are also known (EP 1 491 941). These coloured particles are only achievable by complicated processes and/or they are only suitable for specific applications. Similar coloured particles and their preparation processes are known for analytical techniques (U.S. Pat. No. 5,607,864 and U.S. Pat. No. 5,716,855) and as toner particles for ink jet printing (U.S. Pat. No. 4,613,559).

In EPD, in order to move particles effectively in a non-polar fluid, and to avoid flocculation of particles, the particles require to be sterically stabilised and charged. Reported methods of preparing polymeric particles suitable for EPD are complicated and have numerous steps. Graft copolymer stabilisers made up of poly(12-hydroxystearic acid)-(glycidyl methacrylate)-(methyl methacrylate) are known in prior art (e.g. K E J Barrett, Dispersion Polymerisation in Organic Media, Wiley Interscience 1975). PMMA-b-PODA stabilisers are reported (Harris and Holder. Polymer 47, 2006, 5701-5706). However, many reported stabilisers prepare particles which are too large for EPD or require multiple steps, or use too dilute conditions or require the presence of specific groups to be present in the particles to be captured or can be washed out or removed over time, are not commercially available or are not suitable for dispersion polymerisation in non-aqueous solvent.

There is a need to simplify the complicated preparation of polymeric particles suitable for EPD by means of a simple preparation of charged coloured particles which can be easily dispersed in non-polar media, show electrophoretic mobility and which do not leach colour in a dispersant.

BRIEF SUMMARY OF THE INVENTION

This object is solved by polymer particles for use in electrophoretic devices comprising at least one stabiliser and monomer units of at least one monomer, optionally at least one polymerisable dye, optionally of at least one charged co-monomer, and optionally of at least one crosslinking co-monomer, wherein the stabiliser is a copolymer of methyl methacrylate, octadecyl acrylate, and at least one co-monomer, by a process for the preparation of such polymer particles, by the use of these particles for the preparation of an electrophoretic device, by electrophoretic fluids and devices comprising such particles, and by new copolymer stabilisers.

DETAILED DESCRIPTION OF THE INVENTION

This invention relates specifically to dyed polymer particles with a block copolymer surface stabiliser beneficial to form these particles in a dispersion polymerisation process preparation and for colloidal stability following their preparation; fluid compositions containing these particles and electrophoretic displays (EPD) comprising such particles or fluids.

Preferably, the invention enables the synthesis of dyed polymer particles in a medium suitable for EPD comprising a stabiliser which can be easily irreversibly bound to the particles and which does not rely on specific chemical groups to be present. Preferably, the new copolymer stabilisers comprise a polymerisable group and a 2-ethyl hexyl group to disrupt gelation of particles and give enhanced temperature stability. Particularly, ATRP (atom transfer radical polymerisation) can give complete control of stabiliser molecular weight and structure. New stabilisers are ideal for preparation and stabilisation of particles for EPD.

An essential component of the polymeric particles is a copolymer stabiliser comprising monomer units of methyl methacrylate (MMA), octadecyl acrylate (ODA), and at least one co-monomer. Preferably a block copolymer is used.

In particular, the introduction of a co-monomer into the poly(octadecyl acrylate) (PODA) block of the stabiliser at various molar percentages prevents precipitation of the stabiliser from dodecane solution and gelation of the polymeric particles. To further improve particle stability, a polymerisable group can be introduced into the stabiliser structure. This modification enables the stabiliser to be chemically bound to the resulting polymer particles. This adaptation is beneficial when dispersions are placed into EPD cells and devices, since it prevents the stabiliser from detaching and solubilising in the non-polar solvent during the switching process. The stabiliser is polymerised into the polymer particle and cannot be removed by solvent washing or over time. Throughout this specification, poly(methyl methacrylate)-block-poly(octadecyl acrylate) stabilisers are also called PMMA-b-PODA stabilisers.

No specific chemical groups are required for the copolymer stabiliser to work other than the presence of another monomer in addition to methyl methacrylate and octadecyl acrylate. Preferably, co-monomers with branched alkyl groups can be used such as ethyl hexyl acrylate (EHA).

The stabiliser is specifically designed so that the poly (methyl methacrylate) (PMMA) block becomes entangled in the growing polymer particle and is incompatible with the solvent whereas the PODA block is complimentary with the non-polar solvent. Specifically, the inclusion of ethyl hexyl groups in the new stabiliser provides benefits such as better temperature stability. The inclusion of a polymerisable group in the new stabiliser is also beneficial in this application since the stabiliser cannot be removed during any washing process or over time in display operation.

The new PMMA-b-PODA stabilisers according to the invention can preferably be used to prepare dyed and optionally cross-linked polymer particles suitable for EPD. For example cyan, magenta, yellow and black dyed polymer particles can be produced using this stabiliser having good mobility when switched in an electrophoretic cell. Dyes can be also irreversibly entangled into the forming polymer particles as well as the stabiliser by using polymerisable dyes, so that the dye is not able to leach from the particle over a long time period. Dyed polymer particles have a much lower density than pigment particles whose use has been reported in EPD. In an EPD, these dyed polymer particles should settle much more slowly than pigment particles, allowing for better bistability. Additionally, such dyed polymer particles advantageously do not swell in non-polar EPD solvents due to being cross-linked through dyes with more than one polymerisable group.

Usually, a monomer composition for the preparation of polymer particles according to the invention comprises at least one copolymer stabiliser, at least one monomer, at least one initiator, optionally at least one polymerisable dye, optionally at least one charged co-monomer, and optionally at least one cross-linking co-monomer. Preferably, a monomer composition according to the invention comprises a monomer providing the basic structure, a copolymer stabiliser, a polymerisable dye, optionally an ionic co-monomer, and an initiator. Preferably the polymerisation according to the invention is a free radical polymerisation.

Preferably, a simple 1-step reaction in a non-aqueous, preferably non-polar medium is used. The preferred solvents are non-polar hydrocarbon solvents, especially such used in EPD fluids, i.e. the Isopar series (Exxon-Mobil), Norpar, Shell-Sol (Shell), Sol-Trol (Shell), naphtha, and other petroleum solvents, as well as long chain alkanes such as dodecane, tetradecane, decane and nonane. Especially preferred is dodecane. Oil-soluble initiators are preferred in this dispersion polymerisation. Preferably the coloured polymer particles are simply separated from the reaction suspension by filtration, preferably by pouring the suspension through a pore size filter, i.e. a 50 µm pore size filter, or the particles can be cleaned by centrifuging.

An essential component of polymer particles prepared by the present process is a copolymer which acts as steric stabiliser and/or surface modifier into the particles. The stabiliser is a copolymer of methyl methacrylate, octadecyl acrylate, and at least one co-monomer.

Suitable co-monomers are 2-ethylhexyl methacrylate, benzyl methacrylate, butyl methacrylate, cyclohexyl methacrylate, ethyl methacrylate, hexyl methacrylate, Isobornyl methacrylate, isobutyl methacrylate, isodecyl methacrylate, lauryl methacrylate, stearyl methacrylate, phenyl methacrylate, tert-butyl methacrylate, 3,5,5-trimethylhexyl methacrylate and the acrylate and acrylamide equivalents. Preferably, the co-monomer is a (meth)acrylic acid ester of a branched alcohol. Especially preferred is 2-ethyl hexyl acrylate.

Preferred stabilisers according to the invention are copolymers of methyl methacrylate, octadecyl acrylate, and ethyl hexyl acrylate, especially poly(methyl methacrylate)-block-poly(octadecyl acrylate)/poly(ethyl hexyl acrylate), also called $PMMA_n$-b-$P(ODA_m$-co-$EHA_p)$, wherein n is the number of methyl methacrylate monomer units, m is the number of octadecyl acrylate monomer units, and p is the number of ethyl hexyl acrylate monomer units. In particular, n is in the range of 5-200, preferably 5-40. In particular, m is in the range of 40-150, preferably 40-90. In particular, p is in the range of 1-80, preferably 3-50.

Copolymer stabilisers having a molecular weight $M_n$ of 2000-50000, preferably 3000-30000, especially 4000-25000, are preferred. Especially copolymers with a narrow molecular weight distribution are preferred. The molecular weight $M_n$ can be determined by gel permeation chromatography (GPC) in tetrahydrofuran using PMMA as standard, structures are calculated based on results from $^1H$ NMR analyses. Preferably the molecular weight Mn is determined by gel permeation chromatography (GPC) in tetrahydrofuran as described in detail in the following experimental part.

Block copolymers and their synthesis are known to the skilled artisan. Block copolymers with a narrow weight distribution are particularly prepared by living radical polymerisations, such as atom transfer radical polymerisation (ATRP), nitroxide-mediated polymerisation (NMP), reversible addition fragmentation transfer polymerisation (RAFT) and single electron transfer (SET). The characteristics of living polymerisation are polymerisation proceeding until all monomer is consumed, molecular weight control by stoichiometry of reaction, and block copolymer preparation by sequential monomer addition. Preferably A-B diblock copolymers are prepared by ATRP.

ATRP differs from conventional radical based polymer manufacturing methods by allowing the preparation of complex polymer structures using a special catalyst that adds one monomer at a time to a growing polymer chain. This process can be shut down or re-started, depending on how the temperature and other parameters of the reaction are varied. ATRP is a robust way to uniformly and precisely control the chemical composition and architecture of polymers as well as the uniform growth of every polymer chain, while employing a broad range of monomers. ATRP and ATRP reagents have been described in the literature (K. Matyjaszewski.; N. V. Tsarevsky, *Nature Chem*, 2009, 1, 276-288. W. Tang, Y. Kwak, W. Braunecker, N. V. Tsarevsky, M. L. Coote, K. Matyjaszewski, J. Am. Chem. Soc, 2008, 130, 10702) and are commercially available, for example from Sigma-Aldrich.

A typical process to prepare a polymerisable A-B diblock stabiliser is described: 2-Hydroxyethyl 2-bromoisobutyrate is commercially available or can be prepared from a mixture of 2-bromo-2-methylpropionyl bromide with ethylene glycol and triethylamine in methylene chloride, 2-Hydroxyethyl 2-bromoisobutyrate is reacted with methyl methacrylate in the presence of copper (I) chloride, copper (II) chloride and N,N,N',N'',N''-pentamethyl-diethylenetriamine or similar to form a PMMA block macroinitiator with hydroxy functionality. This PMMA macroinitiator is reacted with octadecyl acrylate in the presence of copper (I) bromide and a ligand such as N-(n-propyl)-2-pyridyl(methanimine) to form a PMMA-block-PODA copolymer. If desired, a polymerisable group such as acrylate or methacrylate can be added using an esterification techniques such as methacrylic acid plus triethylamine. The A-B PMMA-block-PODA is then precipitated out of solution and isolated as an off white solid.

A typical process under convenient conditions as known in the art to prepare a block copolymer stabiliser according to the invention is exemplified for PMMA-b-P(ODA-co-EHA): 2-Hydroxyethyl 2-bromoisobutyrate is commercially available or can be prepared from a mixture of 2-bromo-2-methylpropionyl bromide with ethylene glycol and triethylamine in methylene chloride. 2-Hydroxyethyl 2-bromoisobutyrate is reacted with methyl methacrylate in the presence of copper (I) chloride, copper (II) chloride and N,N,N',N'',N''-pentamethyldiethylenetriamine or similar to form a PMMA block macroinitiator with hydroxy functionality. This PMMA macroinitiator is reacted with octadecyl acrylate and 2-ethyl hexyl acrylate in predetermined ratios in the presence of copper (I) bromide and a ligand such as N-(n-propyl)-2-pyridyl(methanimine) to form a PMMA-b-P(ODA-co-EHA) copolymer. If desired, a polymerisable group such as acrylate or methacrylate can be added using an esterification technique such as methacrylic acid plus triethylamine to the terminated hydroxyl function. The PMMA-b-P(ODA-co-EHA) is then precipitated out of solution and isolated as an off white solid. The preparation of further stabilisers according to the invention can be carried out analogously.

The polymer particles of the invention can be prepared from most monomer types, in particular methacrylates, acrylates, methacrylamides, acrylonitriles, α-substituted acrylates, styrenes and vinyl ethers, vinyl esters, propenyl ethers, oxetanes and epoxys but would typically be prepared from largest percentage to be monomer, then cross-linker, and include a charged monomer (e.g. quaternised monomer). Especially preferred are methyl methacrylate and ethylene glycol dimethyl methacrylate as a cross-linker and 2-methacryloxy ethyl trimethyl ammonium chloride (MOTAC) as reactive charged monomer but many others could be used, the following are all examples of which could be used which are commercially available from the Sigma-Aldrich chemical company.

Methacrylates:

Methacrylic acid, Methyl methacrylate (MMA), Ethyl methacrylate (EMA), n-Butyl methacrylate (BMA), 2-Aminoethyl methacrylate hydrochloride, Allyl methacrylate, Benzyl methacrylate, 2-Butoxyethyl methacrylate, 2-(tert-Butylamino)ethyl methacrylate, Butyl methacrylate, tert-Butyl methacrylate, Caprolactone 2-(methacryloyloxy)ethyl ester, 3-Chloro-2-hydroxypropyl methacrylate, Cyclohexyl methacrylate, 2-(Diethylamino)ethyl methacrylate, Di(ethylene glycol) methyl ether methacrylate, 2-(Dimethylamino)ethyl methacrylate, 2-Ethoxyethyl methacrylate, Ethylene glycol dicyclopentenyl ether methacrylate, Ethylene glycol methyl ether methacrylate, Ethylene glycol phenyl ether methacrylate, 2-Ethylhexyl methacrylate, Furfuryl methacrylate, Glycidyl methacrylate, Glycosyloxyethyl methacrylate, Hexyl methacrylate, Hydroxybutyl methacrylate, 2-Hydroxyethyl methacrylate, 2-Hydroxyethyl methacrylate, Hydroxypropyl methacrylate Mixture of hydroxypropyl and hydroxyisopropyl methacrylates, 2-Hydroxypropyl 2-(methacryloyloxy)ethyl phthalate, Isobornyl methacrylate, Isobutyl methacrylate, 2-Isocyanatoethyl methacrylate, Isodecyl methacrylate, Lauryl methacrylate, Methacryloyl chloride, Methacrylic acid, 2-(Methylthio)ethyl methacrylate, mono-2-(Methacryloyloxy)ethyl maleate, mono-2-(Methacryloyloxy)ethyl succinate, Pentabromophenyl methacrylate, Phenyl methacrylate, Phosphoric acid 2-hydroxyethyl methacrylate ester, Stearyl methacrylate, 3-Sulfopropyl methacrylate potassium salt, Tetrahydrofurfuryl methacrylate, 3-(Trichlorosilyl)propyl methacrylate, Tridecyl methacrylate, 3-(Trimethoxysilyl)propyl methacrylate, 3,3,5-Trimethylcyclohexyl methacrylate, Trimethylsilyl methacrylate, Vinyl methacrylate. Preferably Methyl methacrylate (MMA), Ethyl methacrylate (EMA), Methacrylic acid, and/or n-Butyl methacrylate (BMA) are used.

Acrylates:

Acrylic acid, 4-Acryloylmorpholine, [2-(Acryloyloxy)ethyl]trimethylammonium chloride, acrylic acid, 2-(4-Benzoyl-3-hydroxyphenoxy)ethyl acrylate, Benzyl 2-propylacrylate, 2-Butoxyethyl acrylate, Butyl acrylate, tert-Butyl acrylate, 2-[(Butylamino)carbonyl]oxy]ethyl acrylate, tert-Butyl 2-bromoacrylate, 4-tert-Butylcyclohexyl acrylate, 2-Carboxyethyl acrylate, 2-Carboxyethyl acrylate oligomers anhydrous, 2-(Diethylamino)ethyl acrylate, i(ethylene glycol) ethyl ether acrylate technical grade, Di(ethylene glycol) 2-ethylhexyl ether acrylate, 2-(Dimethylamino)ethyl acrylate, 3-(Dimethylamino)propyl acrylate, Di pentaerythritol penta-/hexa-acrylate, 2-Ethoxyethyl acrylate, Ethyl acrylate, 2-Ethylacryloyl chloride, Ethyl 2-(bromomethyl)acrylate, Ethyl cis-(β-cyano)acrylate, Ethylene glycol dicyclopentenyl ether acrylate, Ethylene glycol methyl ether acrylate, Ethylene glycol phenyl ether acrylate, Ethyl 2-ethylacrylate, 2-Ethylhexyl acrylate, Ethyl 2-propylacrylate, Ethyl 2-(trimethylsilylmethyl)acrylate, Hexyl acrylate, 4-Hydroxybutyl acrylate, 2-Hydroxyethyl acrylate, 2-Hydroxy-3-phenoxypropyl acrylate, Hydroxypropyl acrylate, Isobornyl acrylate, Isobutyl acrylate, Isodecyl acrylate, Isooctyl acrylate, Lauryl acrylate, Methyl 2-acetamidoacrylate, Methyl acrylate, Methyl α-bromoacrylate, Methyl 2-(bromomethyl)acrylate, Methyl 3-hydroxy-2-methylenebutyrate, Octadecyl acrylate, Pentabromobenzyl acrylate, Pentabromophenyl acrylate, Poly(ethylene glycol) methyl ether acrylate, Poly(propylene glycol) acrylate, Poly(propylene glycol) methyl ether acrylate Soybean oil, epoxidized acrylate, 3-Sulfopropyl acrylate potassium salt, Tetrahydrofurfuryl acrylate, 3-(Trimethoxysilyl)propyl acrylate, 3,5,5-Trimethylhexyl acrylate. Preferably Methyl acrylate, Ethyl acrylate, Acrylic acid, and/or n-Butyl acrylate are used.

Acrylamides:

2-Acrylamidoglycolic acid, 2-Acrylamido-2-methyl-1-propanesulfonic acid, 2-Acrylamido-2-methyl-1-propanesulfonic acid sodium salt solution, (3-Acrylamidopropyl)trimethylammonium chloride solution, 3-Acryloylamino-1-propanol solution purum, N-(Butoxymethyl)acrylamide, N-tert-Butylacrylamide, Diacetone acrylamide, N,N-Dimethylacrylamide, N-[3-(Dimethylamino)propyl]methacrylamide, N-Hydroxyethyl acrylamide, N-(Hydroxymethyl) acrylamide, N-(Isobutoxymethyl)acrylamide, N-Isopropylacrylamide, N-Isopropylmethacrylamide, Methacrylamide, N-Phenylacrylamide, N-[Tris(hydroxymethyl)methyl]acrylamide.

Styrenes

Styrene, Divinyl benzene, 4-Acetoxystyrene, 4-Benzyloxy-3-methoxystyrene, 2-Bromostyrene, 3-Bromostyrene, 4-Bromostyrene, α-Bromostyrene, 4-tert-Butoxystyrene, 4-tert-Butylstyrene, 4-Chloro-α-methylstyrene, 2-Chlorostyrene, 3-Chlorostyrene, 4-Chlorostyrene, 2,6-Dichlorostyrene, 2,6-Difluorostyrene, 1,3-Diisopropenylbenzene, 3,4-Dimethoxystyrene, α,2-Dimethylstyrene, 2,4-Dimethylstyrene, 2,5-Dimethylstyrene,N,N-Dimethylvinylbenzylamine, 2,4-Diphenyl-4-methyl-1-pentane, 4-Ethoxystyrene, 2-Fluorostyrene, 3-Fluorostyrene, 4-Fluorostyrene, 2-Isopropenylaniline, 3-Isopropenyl-α,α-dimethylbenzyl isocyanate, Methylstyrene, α-Methylstyrene, 3-Methylstyrene, 4-Methylstyrene, 3-Nitrostyrene, 2,3,4,5,6-Pentafluorostyrene, 2-(Trifluoromethyl)styrene, 3-(Trifluoromethyl)styrene, 4-(Trifluoromethyl)styrene, 2,4,6-Trimethylstyrene. Preferably Styrene and/or Divinyl benzene are used.

Vinyl Groups

3-Vinylaniline, 4-Vinylaniline, 4-Vinylanisole, 9-Vinylanthracene, 3-Vinylbenzoic acid, 4-Vinylbenzoic acid, Vinylbenzyl chloride, 4-Vinylbenzyl chloride, (Vinylbenzyl) trimethylammonium chloride, 4-Vinylbiphenyl, 2-Vinylnaphthalene, 2-Vinylnaphthalene, Vinyl acetate, Vinyl benzoate, Vinyl 4-tert-butylbenzoate, Vinyl chloroformate, Vinyl chloroformate, Vinyl cinnamate, Vinyl decanoate, Vinyl neodecanoate, Vinyl neononanoate, Vinyl pivalate, Vinyl propionate, Vinyl stearate, Vinyl trifluoroacetate.

Other monomers which may be used are those which have groups to help stabilisation of the particles, e.g. Poly(ethylene glycol) methyl ether acrylate, Poly(ethylene glycol) phenyl ether acrylate, lauryl methacrylate, Poly(ethylene glycol) methyl ether acrylate, Poly(propylene glycol) methyl ether acrylate, Lauryl acrylate and fluorinated monomers of above. Some of the monomers have groups for further reaction if so desired, e.g. Glycidyl ethacrylate, 2-Hydroxyethyl methacrylate.

The following compounds can be used as intraparticle crosslinking monomers for solubility control and solvent swelling resistance: ethylene glycol dimethacrylate (EGDMA), allyl methacrylate (ALMA), divinyl benzene, Bis[4-(vinyloxy)butyl] adipate, Bis[4-(vinyloxy)butyl]1,6-hexanediylbiscarbamate, Bis[4-(vinyloxy)butyl]isophthalate, Bis[4-(vinyloxy)butyl](methylenedi-4,1-phenylene) biscarbamate, Bis[4-(vinyloxy)butyl]succinate, Bis[4-(vinyloxy)butyl]terephthalate, Bis[4-(vinyloxymethyl) cyclohexylmethyl]glutarate, 1,4-Butanediol divinyl ether, 1,4-Butanediol vinyl ether, Butyl vinyl ether, tert-Butyl vinyl ether, 2-Chloroethyl vinyl ether, 1,4-Cyclohexanedimethanol divinyl ether, 1,4-Cyclohexanedimethanol vinyl ether, Di(ethylene glycol) divinyl ether, Di(ethylene glycol) vinyl ether, Ethylene glycol butyl vinyl ether, Ethylene glycol vinyl ether, Tris[4-(vinyloxy)butyl]trimellitate, 3-(Acryloyloxy)-2-hydroxypropyl methacrylate, Bis[2-(methacryloyloxy)ethyl]phosphate, Bisphenol A propoxylate diacrylate, 1,3-Butanediol diacrylate, 1,4-Butanediol diacrylate, 1,3-Butanediol dimethacrylate, 1,4-Butanediol dimethacrylate, N,N'-(1,2-Dihydroxyethylene)bisacrylamide, Di(trimethylolpropane) tetraacrylate, Diurethane dimethacrylate, N,N'-Ethylenebis(acrylamide), Glycerol 1,3-diglycerolate, Glycerol dimethacrylate, 1,6-Hexanediol diacrylate, 1,6-Hexanediol dimethacrylate, 1,6-Hexanediyl-bis[oxy(2-hydroxy-3,1-propanediyl)]bisacrylate, Hydroxypivalyl hydroxypivalate bis[6-(acryloyloxy) hexanoate], Neopentyl glycol diacrylate, Pentaerythritol diacrylate, Pentaerythritol tetraacrylate, Pentaerythritol triacrylate, Poly(propylene glycol) diacrylate, Poly(propylene glycol) dimethacrylate, 1,3,5-Triacryloylhexahydro-1,3,5-triazine, Tricyclo[5.2.1.0]decanedimethanol diacrylate, Trimethylolpropane benzoate diacrylate, Trimethylolpropane ethoxylate methyl ether diacrylate, Trimethylolpropane ethoxylate triacrylate, Trimethylolpropane triacrylate, Trimethylolpropane trimethacrylate, Tris[2-(acryloyloxy)ethyl] isocyanurate, Tri(propylene glycol) diacrylate.

Optionally, the monomer composition comprises at least one charged co-monomer. Examples of cationic monomers for particle stability and particle size control are 2-methacryloxy ethyl trimethyl ammonium chloride (MOTAC), acryloxy ethyl trimethyl ammonium chloride (AOTAC), [3-(Methacryloylamino)propyl]trimethylammonium chloride, [2-(Methacryloyloxy)ethyl]trimethylammonium methyl sulfate solution, tetraallyl ammonium chloride, diallyl dimethyl ammonium chloride, (Vinylbenzyl)trimethylammonium chloride. Preferably 2-methacryloxy ethyl trimethyl ammonium chloride (MOTAC), acryloxy ethyl trimethyl ammonium chloride (AOTAC) and [2-(Methacryloyloxy)ethyl]trimethylammonium methyl sulfate solution are used.

Examples of anionic monomers are sodium, potassium or triethylamine salts of methacrylic acid, Acrylic acid, 2-(Trifluoromethyl)acrylic acid, 3-(2-Furyl)acrylic acid, 3-(2-Thienyl)acrylic acid, 3-(Phenylthio)acrylic acid, Poly (acrylic acid) potassium salt, Poly(acrylic acid) sodium salt, Poly(acrylic acid), Poly(acrylic acid, sodium salt) solution, trans-3-(4-Methoxybenzoyl)acrylic acid, 2-Methoxycinnamic acid, 3-Indoleacrylic acid, 3-Methoxycinnamic acid, 4-Imidazoleacrylic acid, 4-Methoxycinnamic acid, Poly(styrene)-block-poly(acrylic acid), Poly(acrylonitrile-co-butadiene-co-acrylic acid), dicarboxy terminated, Poly(acrylonitrile-co-butadiene-co-acrylic acid), dicarboxy terminated, glycidyl methacrylate diester, 2,3-Diphenyl-Acrylic Acid, 2-Me-Acrylic Acid, 3-(1-Naphthyl)Acrylic Acid, 3-(2,3,5,6-Tetramethylbenzoyl)Acrylic Acid, 3-(4-Methoxyphenyl) Acrylic Acid, 3-(4-Pyridyl)Acrylic Acid, 3-p-Tolyl-Acrylic Acid, 5-Norbornene-2-Acrylic Acid, Trans-3-(2,5-Dimethylbenzoyl)Acrylic Acid, Trans-3-(4-Ethoxybenzoyl)Acrylic Acid, Trans-3-(4-Methoxybenzoyl)Acrylic Acid, 2,2'-(1,3-Phenylene)Bis(3-(2-aminophenyl)Acrylic Acid), 2,2'-(1,3-Phenylene)Bis(3-(2-Aminophenyl)Acrylic Acid) hydrochloride, 2,2'-(1,3-Phenylene)Bis(3-(2-Nitrophenyl)Acrylic Acid), 2-[2-(2',4'-Difluoro[1,1'-Biphenyl]-4-Yl)-2-Oxoethyl]Acrylic Acid, 2-(2-(2-Chloroanilino)-2-Oxoethyl)-3-(4-Methoxyphenyl)Acrylic Acid, 2-(2-((2-Hydroxyethyl) Amino)-2-Oxoethyl)-3-(4-Methoxyphenyl)Acrylic Acid, 2-(2-(Cyclohexylamino)-2-Oxoethyl)-3-(4-Methoxyphenyl) Acrylic Acid.

A preferred monomer composition comprises methyl methacrylate, dye monomer, diblock stabiliser optionally methacrylic acid.

Preferably, an oil soluble initiator is used in the non-aqueous copolymerisation in order to control size, particle morphology and to reduce the residual monomers at the end of the reaction. Preferably an oil-soluble thermal initiator is added in the present process. Preferably 2,2'-Azobis(2.4-dimethyl valeronitrile), Dimethyl 2,2'-azobis(2-methylpropionate), 2,2'-Azobis(2-methylbutyronitrile) or Vazo 67 are used.

The present process preferably provides a simple way of preparing coloured particles by incorporation of a polymerisable dye in-situ which does not leach into typical EPD fluids. Use of a polymerisable dye in the formative stage of the particle, enables the dye to become irreversibly bound with the monomers and co-monomers and become an intrinsic part of the particle. Since the dye is covalently bound to the monomers in the particle, it is highly unlikely to leach into any solvent suitable for EPD. Moreover, in this synthesis the dye and the surface modifiers are separate entities and can be changed independently unlike in the state of the art in which the dye and charge are intrinsically linked.

An essential component of this preferred process is a polymerisable dye. In general the polymerisable dyes are solvent soluble and they may be anionic, cationic or neutral. Preferably solvent soluble dyes are used. The function of the polymerisable dye is to colour the particle. The polymerisable dye consists of a chromophore, one or more polymerisable groups, optional linker groups (spacers), and optional groups to modify physical properties (like solubility, light fastness, etc.) and optionally charged group(s).

The polymerisable dye preferably comprises a chromophoric group and at least one functional group selected from polymerisable groups e.g. methacrylates, acrylates, methacrylamides, acrylonitriles, α-substituted acrylates, styrenes and vinyl ethers, vinyl esters, propenyl ethers, oxetanes and epoxys etc., in particular methacrylates and acrylates. The polymerised group may be attached directly to the chromophoric group or may be attached through a linker group. An example of a suitable linker group is an optionally substituted alkyl chain, a polyether alkyl chain, a cycloalkyl or aromatic ring, heteroaromatic ring or a combination thereof.

The chromophoric group preferably comprises of conjugated aromatic (including heteroaromatic) and/or multiple bonds including: azo (including monoazo, bisazo, trisazo, linked azos etc), metallised azo, anthraquinone, pyrroline, phthalocyanine, polymethine, aryl-carbonium, triphendioxazine, diarylmethane, triarylmethane, anthraquinone, phthalocyanine, methine, polymethine, indoaniline, indophenol, stilbene, squarilium, aminoketone, xanthene, fluorone, acridene, quinolene, thiazole, azine, induline, nigrosine, oxazine, thiazine, indigoid, quinonioid, quinacridone, lactone, benzodifuranone, flavonol, chalone, polyene, chroman, nitro, naphtholactam, formazene or indolene group or a combination of two or more such groups. Preferred chromophoric groups are azo groups (especially monoazo, and bisazo), anthraquinone and phthalocyanine groups. Preferably the polymerisable dye comprises a chromophoric group and one or more functional groups selected from an acrylate or methacrylate backbone.

A polymerisable dye may contain a single chromophore, for example with bright yellow, magenta or cyan colours and self shade blacks. However, it may also contain mixed covalently attached chromophores for example to obtain a black colour, by covalently attached brown and blue or yellow, magenta and cyan. Green can be obtained by yellow and cyan etc. Extended conjugated chromophores can also be used to obtain some shades. For example, bis- and trisazo compounds can be used to obtain blacks and other duller shades (navy blue, brown, olive green, etc).

Mixtures of polymerisable dyes can also be used to obtain the correct particle shade; for example a black from single component mixtures of brown and blue or yellow, magenta and cyan pre-polymerised dyes. Similarly shades can be tuned for example by adding small quantities of separate polymerisable dyes to modify the colour of the particles (e.g. 95% yellow and 5% cyan to get a greener yellow shade).

Modified polymerisable dyes (with reactive group(s)) from the application groups of reactive (anionic), direct (anionic), acidic (anionic) and basic (cationic) dyes as designated by the Colour Index (published by The Society of Dyers and Colourists with the American Association of Textile Chemists and Colorists e.g. 3$^{rd}$ edition 1982) are preferred. Preferable examples of polymerisable dyes are summarised in the following Tables. The following are examples of dyes which can be used. Preferably dyes with more than one polymerisable group are used. In principle any polymerisable dye can be used, preferable with more than one polymerisable group, most preferably with 2 polymerisable groups, and preferably with a methacrylate or acrylate function. Additionally, a dye which is insoluble in non-polar type solvents could be used, for example a cationic or anionic dye, since this will not preferentially leach into the organic solvent phase but remain in a particle.

TABLE 1

| Name for Patent | Colour | Structure |
|---|---|---|
| Dye 1 | Cyan<br>(E)-4,4'-(4-((2,6-dicyano-4-nitrophenyl)diazenyl)-2-methoxy-5-(3,5,5-trimethylhexanamido)phenylazanediyl)bis(butane-4,1-diyl) diacrylate | |
| Dye 2 | Magenta<br>Acrylic acid 2-[[3-butyrylylamino-4-(4-cyano-3-methylisothiazol-5-ylazo)-phenyl]-(2-acryloyloxyethyl)-amino]-ethyl ester | |

TABLE 1-continued

| Name for Patent | Colour | Structure |
|---|---|---|
| Dye 3 | Yellow 2,2'-(4-((5-cyano-1-(2-ethylhexyl)-2-hydroxy-4-methyl-6-oxo-1,6-dihydropyridin-3-yl)diazenyl)phenylsulfonylazanediyl) bis(ethane-2,1-diyl) diacrylate | |
| Dye 4 | Black 2,2'-(4-((E)-(4-((E)-(2,4-dinitrophenyl)diazenyl)-2,5-bis(2-ethylhexyloxy)phenyl)diazenyl)-3-methylphenylazanediyl)bis(ethane-2,1-diyl) bis(3-chloropropanoate) | |
| Dye 5 | Red 2,2'-(4-((4-Cyano-3-methylisothiazol-5-yl)diazenyl)phenylazanediyl)bis (ethane-2,1-diyl) bis(2-methylacrylate) | |
| Dye 6 | Magenta (2,2'-(3-Acetamido-4-((4-butyl-2,6-dicyanophenyl)diazenyl)phenyl-azanediyl) bis(ethane-2,1-diyl) bis(2-methylacrylate) | |

The synthesis of most preferred dyes is disclosed in WO 2010/089057 and WO 2012/019704.

The polymerisable composition for the preparation of polymer particles of the invention preferably comprises up to 30%, preferably 3.5-20%, % of at least one copolymer stabiliser, up to 15%, preferably 3.0-15%, especially 5.0-12% by weight of at least one polymerisable dye, 50-95%, preferably 70-90%, by weight of at least one monomer, optionally 1-40%, preferably 1-10%, by weight of cross-linking monomer, optionally 1-30%, preferably 1-10%, by weight of ionic monomer, optionally 0-3%, by weight of chain transfer agent and 0.1-10%, preferably 0.1-5%, by weight of initiator, all percentages are based on the total weight of the polymerisable composition (except solvent). Advantageously, the polymerisable composition of the invention comprises a non-polar hydrocarbon solvent, especially dodecane.

Cross-linked copolymer nanoparticles can preferably be prepared by copolymerisation of methyl methacrylate (MMA), block copolymer PMMA-b-P(ODA-co-EHA) as stabiliser, especially with a polymerisable block copolymer stabiliser, polymerisable dyes with 2 acrylate or methacrylate groups, oil soluble initiator, optionally a chain transfer agent.

When the polymer particles are prepared without the use of a polymerisable dye, it is possible to colour the particles by incorporation of at least one dye by known techniques, such as solvent swelling of particles as described in WO 2009/100803. A large number of possibly absorbable dyes are suitable such as azo dyes, anthraquinone dyes, triarylmethane dyes, acridine dyes, cyanine dyes, oxazine dyes, polymethine dyes, or thiazine dyes. Azo-based dyes, anthraquinone-based dyes, and triarylmethane-based dyes are preferred examples. Suitable dyes are preferably soluble in the particle swelling solvent and insoluble in water. This feature allows various dyes to be driven by the solvent within the nanoparticles and retained inside. Preferred dyes are Waxoline blue APFW from Lubrizol (chemical category: anthraquinone), mixture of solvent yellow (colour index: 11021)+ solvent blue (colour index: 61556) distributed by Europhtal—France, organol red distributed by Europhtal France (chemical category: p. Phenylazoaniline), macrolex blue RR GRAN from Bayer (chemical category: anthraquinone), macrolex red violet from Bayer (chemical category: anthraquinone), solvent yellow 16 (colour index 12700) distributed by Europhtal France, Waxoline black OBP [solvent yellow 14 (anthraquinone)+carbon black] from Lubrizol.

Preferably a pre-polymerised dye is used in this colouring technique as described in WO 2010/089058. Pre-polymerised means that a polymerisable dye has been polymerised before it is used to colour a polymer particle. Pre-polymerised dyes that have been homo-polymerised such as commercially available Poly(Disperse Red 1 methacrylate) are suitable, also suitable are pre-polymerised dyes which have been polymerised with other monomers, e.g. Disperse Yellow 7 acrylate which has been polymerised together with methyl methacrylate.

Especially preferred is the use of polymerisable dyes which are polymerised in a subsequent process step as described in WO 2010/089059. Suitable polymerisable dyes are those described in the foregoing for copolymerisation with monomers and A-B diblock copolymers to form coloured polymer particles, advantageously the preferred dyes.

In general the dyes for may be solvent soluble or water soluble and they may be anionic, cationic or neutral. Mixtures of dyes can also be used to obtain the correct particle shade; for example a black from single component mixtures of brown and blue or yellow, magenta and cyan pre-polymerised dyes. Similarly shades can be tuned by for example by adding small quantities of separate pre-polymerised dyes to modify the colour of the particles (e.g. 95% yellow and 5% cyan to get a greener yellow shade) Finally, the polymer particles may be washed and optionally dried.

Polymer particles prepared according to the invention are preferably spherical particles with a size (diameter) in the range of 50-1300 nm and preferably with a low polydisperse size distribution. Preferred particle sizes are 50-1000 nm. Particle sizes are determined by dynamic light scattering of particle dispersions by a common apparatus such as a Malvern NanoZS particle analyser or preferably by SEM (Scanning Electron Microscopy) and image analysis.

A further subject of the invention is a process for the preparation of polymer particles. The polymer particles of the invention are preferably prepared using a dispersion polymerisation. This is a convenient single step method of preparing monodisperse particles. It is performed in a fluid which is a good solvent for the monomer and a non-solvent for the synthesised polymer particles. This solvent can also be used as the same solvent for EPD, e.g. dodecane. The preferred solvents are non-polar hydrocarbon solvents, especially such used in EPD fluids, i.e. the Isopar series (ExxonMobil), Norpar, Shell-Sol (Shell), Sol-Trol (Shell), naphtha, and other petroleum solvents, as well as long chain alkanes such as dodecane, tetradecane, decane and nonane. Especially preferred is dodecane. The concentration of the particles in the non-polar solvent can be increased if desired by centrifugation, i.e. forced settling of the particles and pouring off excess solvent, or a stirred cell filtration system can be used. The dispersion can be washed with a non-polar solvent if required. If necessary, the coloured polymer particles are simply separated from the reaction suspension by filtration, preferably by pouring the suspension through a pore size filter, i.e. a 0.1 µm pore size filter, or the particles can be cleaned by centrifuging.

All process steps described above and below can be carried out using known techniques and standard equipment which are described in prior art and are well-known to the skilled person. The selection of the polymerisation conditions depends on the required size and size distribution of the particles. Adjustment of polymerisation conditions is well known to someone skilled in the art.

Preferably the polymerisation according to the invention is a free radical polymerisation. Typical process conditions are described for the preparation of dyed polymer particles incorporating a steric stabiliser, methyl methacrylate, dye monomer and methacrylic acid: The components are added to a non-polar hydrocarbon solvent, preferably dodecane. The reaction mixture is stirred under nitrogen at 300 rpm, and then heated to 60-90, preferably 75° C. An initiator, preferably Vazo 59 or azobisisobutyronitrile is added to initiate polymerisation. The reaction is allowed to proceed for approximately 2 hours after which time the reaction is allowed to cool to room temperature. The particles are filtered through a 50 micron cloth and are cleaned by centrifugation and redispersion in dodecane if required.

Particles of the invention are primarily designed for use in electrophoretic displays. So, further subjects of the invention are electrophoretic fluids and electrophoretic displays comprising the particles. A typical electrophoretic display preferably consists of the particles dispersed in a low polar or non-polar solvent along with additives to improve electrophoretic properties, such as stability and charge. Examples of such electrophoretic dispersions are well described in the literature, for example U.S. Pat. No. 7,247,379; WO 99/10767; US 2007/0128352; U.S. Pat. No. 7,236,290; U.S. Pat. No. 7,170,670; U.S. Pat. No. 7,038,655; U.S. Pat. No. 7,277,218; U.S. Pat. No. 7,226,550; U.S. Pat. No. 7,110,162; U.S. Pat. No. 6,956,690; U.S. Pat. No. 7,052,766; U.S. Pat. No. 6,194,488; U.S. Pat. No. 5,783,614; U.S. Pat. No. 5,403,518; U.S. Pat. No. 5,380,362.

Typical additives to improve the stability of the electrophoretic fluid (either by steric stabilisation or by use as a charging agent) are known to experts in the field and include (but are not limited to) the Brij, Span and Tween series of surfactants (Aldrich), the Solsperse, Ircosperse and Colorburst series (Lubrizol), the OLOA charging agents (Chevron Chemicals) and Aerosol-OT (Aldrich). Any other additives to improve the electrophoretic properties can be incorporated provided they are soluble in the formulation medium, in particular thickening agents or polymer additives designed to minimise settling effects.

The dispersion solvent can be chosen primarily on the basis of dielectric constant, refractive index, density and viscosity. A preferred solvent choice would display a low dielectric constant (<10, more preferably <5), high volume resistivity (about $10^{15}$ ohm-cm), a low viscosity (less than 5 cst), low water solubility, a high boiling point (>80° C.) and a refractive index and density similar to that of the particles. Tweaking these variables can be useful in order to change the behaviour of the final application. For example, in a slow-switching application such as poster displays or shelf labels, it can be advantageous to have an increased viscosity to improve the lifetime of the image, at the cost of slower switching speeds. However in an application requiring fast switching, for example e-books and displays, a lower viscosity will enable faster switching, at the cost of the lifetime in which the image remains stable (and hence an increase in power consumption as the display will need more frequent addressing). The preferred solvents are often non-polar hydrocarbon solvents such as the Isopar series (Exxon-Mobil), Norpar, Shell-Sol (Shell), Sol-Trol (Shell), naphtha, and other petroleum solvents, as well as long chain alkanes such as dodecane, tetradecane, decane and nonane). These tend to be low dielectric, low viscosity, and low density solvents. A density matched particle/solvent mixture will yield much improved settling/sedimentation characteristics and thus is desirable. For this reason, often it can be useful to add a halogenated solvent to enable density matching. Typical examples of such solvents are the Halocarbon oil series (Halocarbon products), or tetrachlorethylene, carbon tetrachloride, 1,2,4-trichlorobenzene and similar solvents. The negative aspect of many of these solvents is toxicity and environmental friendliness, and so in some cases it can also be beneficial to add additives to enhance stability to sedimentation rather than using such solvents. The preferred additives and solvents used in the formulation of the particles of the invention are OLOA11000 (Chevron Chemicals), Ircosperse 2153 (Lubrizol Ltd), and dodecane (Sigma Aldrich).

Usually electrophoretic fluids comprise a charged inorganic nanoparticle such as titania, alumina or barium sulphate, coated with a surface layer to promote good dispersibility in dielectric media and a dielectric fluid media. Furthermore, the coloured particles of the present invention may be used in combination with white reflective polymer particles prepared by a process comprising the steps of a) forming a reverse emulsion comprising at least one polymer, at least one white reflective particle, at least one polar solvent, at least one non-polar solvent, and at least one surfactant and b) removing the polar solvent or polar solvents by evaporative methods. "Reverse emulsion" means that a non-polar solvent (preferably dodecane, or comparable aliphatic hydrocarbons)) forms the continuous phase and a polar solvent (preferably water) forms the discontinuous phase. Such process is also called either "evaporative precipitation" or "reverse emulsion solvent removal" (RESR) due to the steps involved in forming a reverse emulsion and then removing the solvent from the internal phase by evaporative methods to form a solid particle.

The solvents and additives used to disperse the particles are not limited to those used within the examples of this invention and many other solvents and/or dispersants can be used. Lists of suitable solvents and dispersants for electrophoretic displays can be found in existing literature, in particular WO 99/10767) and WO 2005/017046) The Electrophoretic fluid is then incorporated into an Electrophoretic display element by a variety of pixel architectures, such as can be found in C. M. Lampert, Displays; 2004, 25(5) published by Elsevier B.V., Amsterdam. The Electrophoretic fluid may be applied by several techniques such as inkjet printing, slot die spraying, nozzle spraying, and flexographic printing, or any other contact or contactless printing or deposition technique.

Electrophoretic displays comprise typically, the electrophoretic display media in close combination with a monolithic or patterned backplane electrode structure, suitable for switching the pixels or patterned elements between the black and white optical states or their intermediate greyscale states.

The electrophoretic particles according to the present invention are suitable for all known electrophoretic media and electrophoretic displays, e.g. flexible displays, one particle systems, two particle systems, dyed fluids, systems comprising microcapsules, microcup systems, air gap systems and others as described in C. M. Lampert, Displays; 2004, 25(5) published by Elsevier B.V., Amsterdam. Examples of flexible displays are dynamic keypads, e-paper watches, dynamic pricing and advertising, e-readers, rollable displays, smart card media, product packaging, mobile phones, laptops, display card and digital signage.

The disclosures in the cited references are expressly part of the disclosure content of the present application. In the claims and the description, the words "comprise/comprises/comprising" and "contain/contains/containing" mean that the listed components are included but that other components are not excluded and the terms "the", "a", and "an" are intended to mean one or more of the components of the invention. In the foregoing and in the following examples, unless otherwise indicated all parts and percentages are by weight (wt). The following examples explain the present invention in greater detail without restricting the scope of protection.

EXAMPLES

Materials

Reagents are purchased from Sigma-Aldrich unless otherwise stated. 2,2'-azobis(2-methylbutyronitrile) (V-59) is from Wacko, ethyl-2-iso-bromobutyrate (EIBB) and aluminium oxide from Acros Organics, hexane, dichloromethane, diethyl ether, toluene, methanol, xylene and tetrahydrofuran (THF) all from Fisher. In order to remove inhibitors, methyl methacrylate and ethyl hexyl acrylate (Alfa Aesar) are passed directly through an aluminium oxide column, and octadecyl acrylate is heated to 60° C.; stirred with alumina overnight; and hot filtered.

Dyes used to make particles are previously reported in WO 2010/089057 and WO 2012/019704.

Instrumentation and Analysis $^1H$ and $^{13}C$ nuclear magnetic resonance (NMR) spectra are recorded using a JEOL ECS-400 spectrometer at 30° C. from solutions in $CDCl_3$. Molecular weight characteristics of polymers are estimated relative to PMMA standards by gel permeation chromatography (GPC) using a PL-GPC 50 supplied by Polymer Laboratories Ltd, in conjunction with a refractive index detector. All determinations are carried out at 40° C. with tetrahydrofuran (THF) as a mobile phase at a flow rate of 1 ml min-1, using a 50 mm×7.8 mm 10 μm PLgel guard column and 2×300 mm×7.8 mm 5 μm PLgel Mixed-C columns.

Scanning electron microscope (SEM) images are taken using a JCM-5000 Benchtop SEM (Neoscope), at a specimen height of 55 mm, an acceleration voltage of 15 kV and under high vacuum. Particles are sputtered by gold for 120 seconds at 18 mA before being assessed in the SEM chamber. Centrifugation is carried out on a Heraeus Biofuge Stratos Centrifuge. Dynamic light scattering (DLS) measurements are carried out on colloidal solutions at a range of temperatures using a Zeta-sizer nano series (Nano-ZS) machine, supplied by Malvern Instruments. The z-average, number average and polydispersity are measured at temperatures between 10° C. and 45° C. at a height of 0.85 cm, with measurements taken over a period of 90 seconds with an automatically generated number of scans, ranging from 12-19.

Particle sizes are measured using Image J software version 1.42q.

Synthesis

Example 1: Synthesis of N-(n-propyl)-2-pyridyl(methanimine) (PPMI)

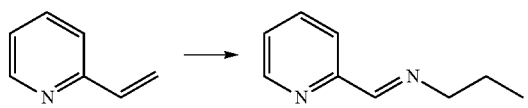

Propylamine (88 ml, 0.730 mol) is added slowly to a mixture of 2-pyridinecarboxaldehyde (60 ml, 0.730 mol) and diethyl ether (90 ml) with stirring on ice. Magnesium sulphate is added and the reaction allowed to stir for two hours at 25° C. The reaction mixture is filtered before solvent is removed under vacuum. The product is then purified by distillation under vacuum, to leave (1) as a yellow oil (54% yield). $^1$H NMR showed expected signals.

Example 2: Synthesis of Hydroxy-Functionalised Initiator—2-Hydroxyethyl 2-bromoisobutyrate

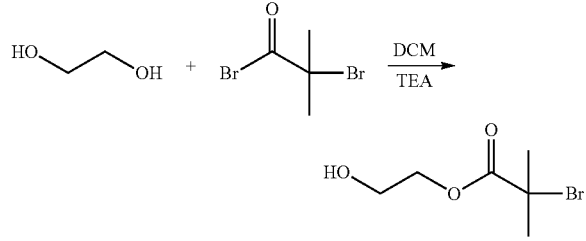

A mixture of 2-bromo-2-methylpropionyl bromide (40.0 g, 0.174 mol) and dichloromethane (40 ml) is added dropwise to an excess of anhydrous ethylene glycol (108.0 g, 1.74 mol) and triethylamine (35.2 g, 0.348 mol) with stirring on ice. The mixture is filtered before solvent is removed under vacuum (64% yield of (2). $^1$H NMR showed expected signals.

Example 3: Synthesis of polymethylmethacrylate-Br (Typical synthesis of macroinitiators; Ratio of monomer to initiator selected to give a theoretical 'n' value of 65)

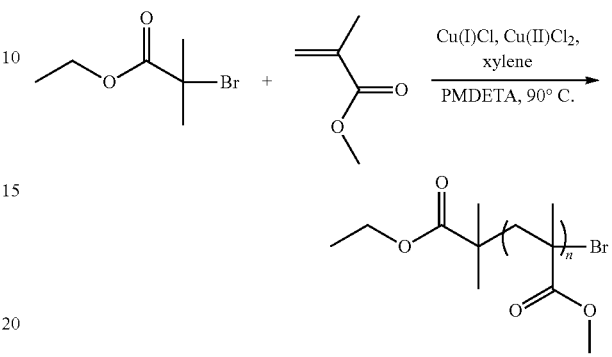

A mixture of methyl methacrylate (70.00 g, 0.699 mol), copper (I) chloride (1.07 g, 0.011 mol), copper (II) chloride (0.07 g, 0.538 mmol), %), N,N,N',N'',N''-pentamethyldiethylenetriamine (PMDETA) (5.59 g, 0.033 mol) and xylene (140 ml) are stirred under nitrogen for an hour. Nitrogen is bubbled through a separate flask of ethyl-2-iso-bromobutyrate (EBIB) (1.57 ml, 0.011 mol) simultaneously. The mixture is heated to 90° C., before ethyl-2-iso-bromobutyrate is injected, and the reaction mixture stirred at temperature for 150 minutes. The reaction mixture is thinned with THF, run down an alumina column and THF is removed under vacuum. The polymer is redissolved in THF and precipitated into cold stirring hexane twice to give macroinitiator (3) as a white powder (58% yield). $^1$H NMR shows expected signals.

Example 4: Synthesis of Hydroxy-Functionalised PMMA-Br

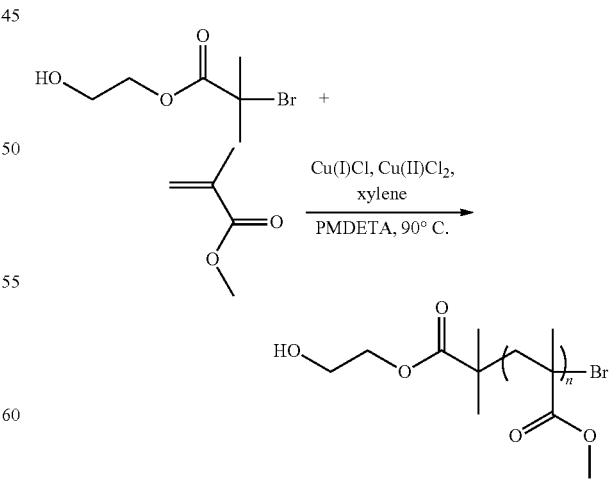

Synthesis as for example 3, with EBIB replaced by hydroxy-functionalised initiator (2) (2.31 g, 0.011 mol), Yield 56% of (4). $^1$H NMR shows expected signals.

Example 5: Synthesis of PMMA-b-PODA Copolymer

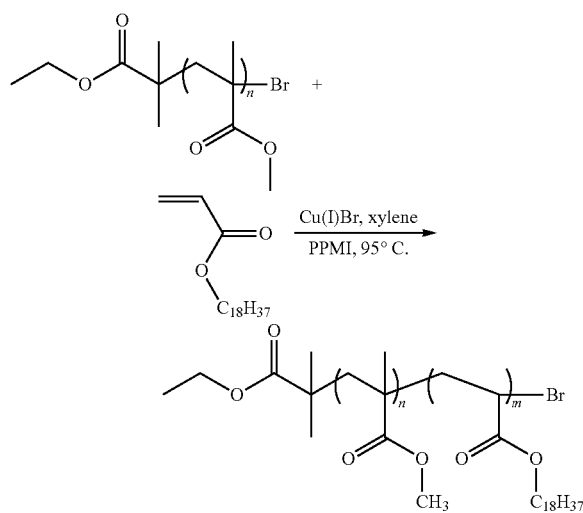

Nitrogen is bubbled through a mixture of octadecyl acrylate (14.35 g, 0.0442 mol), copper (I) bromide (0.106 g, 1.37 mmol), PPMI ligand (1) (0.219 g, 1.47 mmol) and toluene (15 ml) for an hour. This mixture is heated to 95° C. Nitrogen gas is bubbled through a separate flask of (3) (5.000 g, 0.737 mmol) in toluene (10 ml) simultaneously. The solution of (3) in toluene is then injected and the reaction allowed to stir at temperature under nitrogen atmosphere. The mixture is thinned with THF, run down an alumina column and the solvent removed under vacuum. The polymer is then redissolved in DCM and precipitated into cold stirring methanol twice to give (5) as an off-white (brownish) powder (77% yield). Stabilisers 5a, 5b, and 5c are prepared and their properties are shown in Table 2.

Example 6: Synthesis of Hydroxy-Functionalised PMMA-b-PODA Copolymers

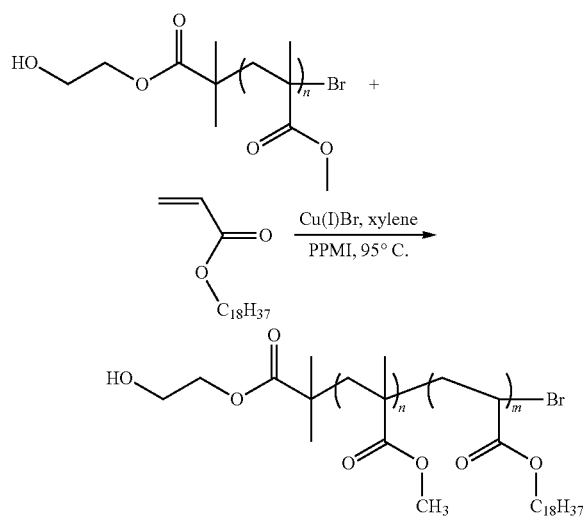

Synthesis as for PMMA-b-PODA copolymer (5), with (3) replaced by hydroxy-functionalised PMMA-Br (5.00 g) (4). Yield is 71% as an off-white solid (6).

Example 7: Synthesis of poly(methyl methacrylate)-block-poly(octadecyl acrylate)/poly(ethyl hexyl acrylate) copolymers [PMMA-b-P(ODA-co-EHA)]

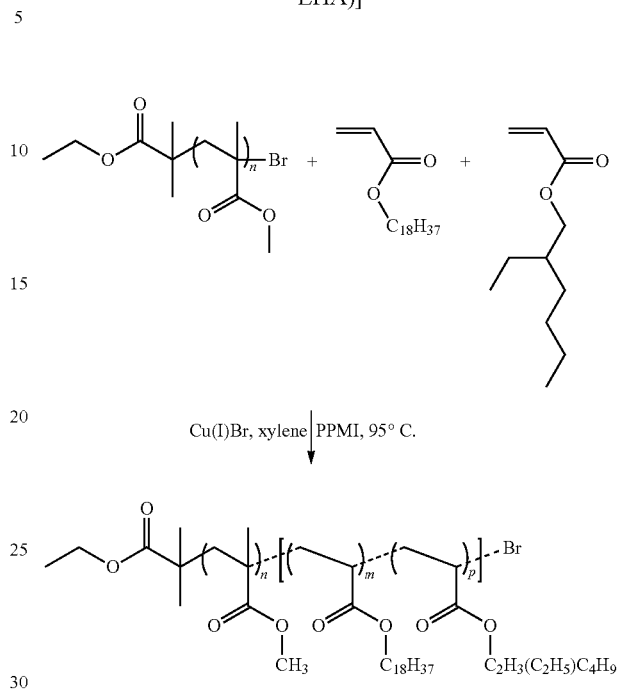

Synthesis as for (5) PMMA-b-PODA copolymers, but amount of ODA reduced (7.176 g, 0.0221 mol) and EHA (4.074 g, 0.0221 mol) also added to initial reaction mixture (for 50/50 Mole %). Yield of (7) is 68%. Stabilisers 7a and 7b are prepared and their properties are shown in Table 2.

Example 8: Synthesis of Hydroxy-Functionalised PMMA-b-P(ODA-Co-EHA) Copolymers

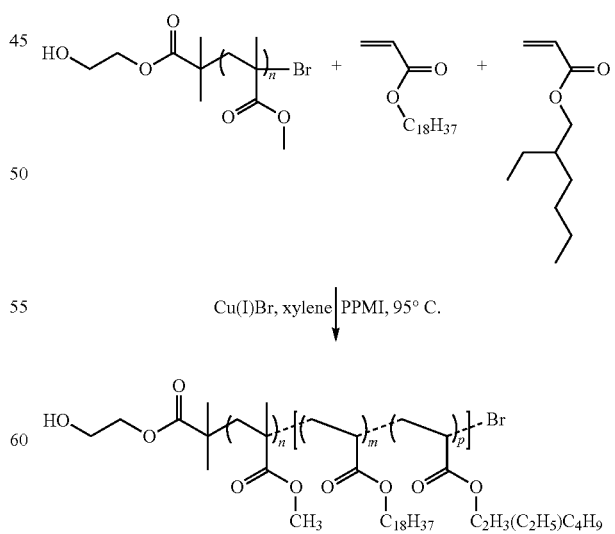

Synthesis as example 7, with (3) replaced by (4) (5.00 g). Yield is 63% giving (8) as an off-white solid.

Example 9: Preparation of Polymerisable Block Polymer Stabiliser PMMA-b-P(ODA-co-EHA)

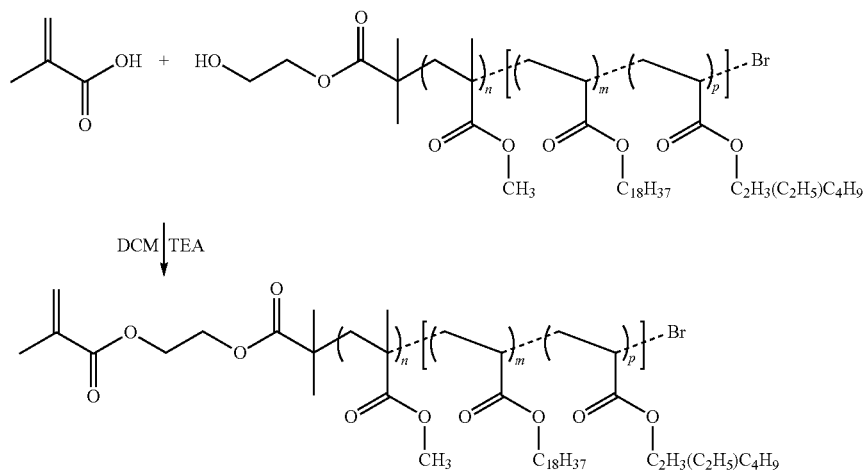

Hydroxy-functionalised PMMA-b-P(ODA-co-EHA) (8) (20.00 g, 0.0012 mol) is added to a mixture of methacryloyl chloride (6.272 g, 0.060 mol), triethylamine (0.243 g, 0.0024 mol) and dichloromethane (20 ml) and allowed to stir for 4 hours. The mixture is filtered and then precipitated twice into cold stirring methanol, removed and dried. The product gives expected signals for $^1$H NMR. Stabilisers 9a and 9b are prepared and their properties are shown in Table 2.

Example 10 (Comparative): Preparation of Random Copolymer PMMA-co-PODA

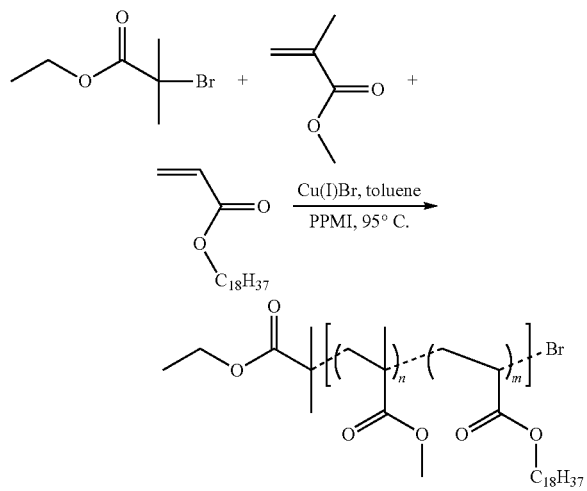

Nitrogen is bubbled through a mixture of methyl methacrylate (8.00 g, 0.0799 mols), octadecyl acrylate (12.00 g, 0.0380 mols), copper (I) bromide (0.0846 g, 0.5895 mmol), PPMI (0.1747 g, 1.179 mmol) and toluene (23.0 ml) for 1 hour. This mixture is heated to 95° C. Nitrogen is also bubbled through a flask of EBIB (0.1149 g, 0.5895 mmol) and toluene (2 ml) for 1 hour simultaneously. The solution of EBIB in toluene is then injected and the reaction allowed to stir at temperature under nitrogen atmosphere for 24 hours. The mixture is then thinned with THF, run down an alumina column and the solvent removed under vacuum. The polymer is then redissolved in DCM and precipitated into cold stirring methanol twice to give a clean white powder (65% yield).

TABLE 2

Structures of stabilisers

| Example | Structure | $M_n^a$ | $PDI^a$ | n | m | p |
|---|---|---|---|---|---|---|
| 5a | PMMA-b-PODA | 31100 | 1.42 | $50^a$ | $80^a$ | — |
| 5b | PMMA-b-PODA | 54100 | 1.52 | $50^a$ | $150^a$ | — |
| 5c | PMMA-b-PODA | 14100 | 1.56 | $65^a$ | $23^a$ | — |
| 7a | PMMA-b-P(ODA-co-EHA) | 15400 | 1.35 | $65^a$ | $25^b$ | $3^b$ |
| 7b | PMMA-b-P(ODA-co-EHA) | 16800 | 1.50 | $65^a$ | $9^b$ | $29^b$ |
| 9a | MMA-PMMA-b-P(ODA-co-EHA) | 18300 | 1.63 | $65^a$ | $10^b$ | $45^b$ |
| 9b | MMA-PMMA-b-P(ODA-co-EHA) | 17100 | 1.49 | $76^a$ | $12^b$ | $30^b$ |
| 10 | PMMA-co-PODA | 59900 | 1.39 | $120^a$ | $145^a$ | — |

$^a$Measured by GPC
$^b$Calculated by molar ratios, confirmed by $^1$H NMR

Example 11: Synthesis of PMMA Microparticles Incorporating Block Copolymer Stabilisers Methyl methacrylate (20.58 g), Stabiliser 5a (1.05 g) and methacrylic acid (0.42 ml) are charged to a 100 ml 3-necked flask equipped with a condenser, nitrogen flow, and an overhead stirrer. Dodecane (25.20 g) is added to the flask, followed by 1-octanethiol (0.13 ml). The mixture is heated with stirring at 300 rpm, once the temperature in the flask is at 75° C., Vazo 59 (0.20 g) is added and the reaction is stirred for 2 hours. The resulting dispersion is filtered through a 50 micron cloth. The dispersion is cleaned using a centrifuge. Centrifugations are carried out at 10 000 rpm for 20 minutes each, replacing the supernatant with dodecane; this is repeated three times. Average particle size is measured by SEM and image analysis: 470 nm, polydispersity: 7.2%.

Similarly prepared particles are made with the following reagents and conditions: (stabiliser percentages based on methyl methacrylate)

TABLE 3

| Example | Stabiliser Example | % Stabiliser | Particle Size(nm) | Polydispersity |
|---|---|---|---|---|
| 12 | 5a | 5.1% | 919 | 8.1% |
| 13 | 5b | 5.1% | 673 | 9.4% |
| 14 | 5c | 5.1% | 611 | 8.5% |
| 15* | 10 | 5.1% | 2230 | 14.9% |
| 16 | 9a | 5.1% | 619 | 11.8% |
| 17 | 9a | 7.5% | 331 | 14.8% |
| 18 | 9a | 6.0% | 673 | 9.8% |
| 19 | 9a | 5.1% | 599 | 9.9% |
| 20 | 9b | 5.1% | 491 | 13.4% |

15* is the comparative example using the random copolymer stabiliser (10). This gives particles which are too large to be used in EPD, and has a higher polydispersity.

PMMA particle dispersions are analysed using DLS. Particles of examples 12-14 prepared using PMMA-b-PODA stabilisers show instability over time, resulting in the fluid dispersion forming a gel when left to stand.

Stabilisers with ethyl hexyl acrylate (EHA) incorporated into the PODA portion of the stabilisers prevented gelation of the PMMA particles of examples 16-20.

Example 21: Synthesis of Cross-Linked PMMA Microparticles Incorporating Block Copolymer Stabilisers Cross-linked PMMA particles are similarly prepared to example 11 using methyl methacrylate (20.58 g), Stabiliser 5a (1.05 g), methacrylic acid (0.42 ml) and EGDMA (ethylene glycol dimethacrylate; 0.2 ml), dodecane (25.20 g), 1-octanethiol (0.13 ml), Vazo 59 (0.20 g) giving white particles sized: 511 nm with a polydispersity of 17.22%.

Similarly prepared particles are made with the following reagents and conditions:

TABLE 4

| Example | Stabiliser | % Stabiliser | % EGDMA | Particle Size (nm) | Polydispersity |
|---|---|---|---|---|---|
| 22 | Stabiliser 7a | 5.1% | 2.0% | 955 | 8.1% |
| 23 | Stabiliser 7b | 5.1% | 3.0% | 584 | 14.9% |

PMMA particle dispersions are analysed using DLS. PMMA particles of examples 22-23 show no gelation.

Example 24: Synthesis of Coloured Polymeric Particles Incorporating Block Copolymer Stabilisers and Polymerisable Dyes Methyl methacrylate (20.58 g), Stabiliser 5a (1.05 g) and methacrylic acid (0.42 ml) are charged to a 100 ml 3-necked flask equipped with a condenser, nitrogen flow, and an overhead stirrer. Dye 6 (1.03 g) is added and stirred for 1 minute to facilitate dissolution of the dye. Dodecane (25.20 g) is added to the flask, followed by 1-octanethiol (0.13 ml). The mixture is heated with stirring at 300 rpm, once the temperature in the flask is at 75° C., Vazo 59 (0.20 g) is added and the reaction is stirred for 2 hours.

The resulting dispersion is filtered through a 50 micron cloth. The dispersion is cleaned using a centrifuge. Centrifugations are carried out at 10 000 rpm for 20 minutes each, replacing the supernatant with dodecane; this is repeated five times. Average particle size is measured by SEM and image analysis: 702 nm, polydispersity: 9.0%.

Similarly prepared particles are made with the following reagents and conditions:

TABLE 5

| Example | Stabiliser | % Stabiliser | Dye | % Dye | Colour | Particle Size (nm) | Polydispersity |
|---|---|---|---|---|---|---|---|
| 25 | 5a | 5.1 | 5 | 5.0 | Red | 779 | 8.9% |
| 26 | 7b | 5.1 | 2 | 10.0 | Magenta | 1074 | 5.2% |
| 27 | 7b | 5.1 | 1 | 5.0 | Cyan | 1273 | 11.6% |
| 28 | 9a | 7.5 | 2 | 10.0 | Magenta | 764 | 19.2% |
| 29 | 9a | 6.0 | 2 | 10.0 | Magenta | 831 | 12.3% |
| 30 | 9a | 8.5 | 2 | 10.0 | Magenta | 662 | 7.25% |
| 31 | 9b | 8.5 | 2 | 10.0 | Magenta | 505 | 6.7% |

PMMA particle dispersions are analysed using DLS. PMMA particles of examples 26-31 show no aggregation.

Example 32: Synthesis of Black PMMA Particles Incorporating Block Copolymer Stabilisers and Polymerisable Dyes Similarly prepared using methyl methacrylate (16.0 g), Stabiliser 9a (3.99 g) and methacrylic acid (0.32 ml), dye 3 (0.24 g) and dye 4 (1.36 g), dodecane (32.14 g), 1-octanethiol (0.10 ml), Vazo 59 (0.20 g). Particle size is measured to be 130 nm by SEM with low polydispersity.

Example 33: Colour Coordinate Measurement of an Electrophoretic Formulation Containing a Dispersion of Magenta Coloured Particles Incorporating Stabiliser 9a The electrophoretic ink is prepared by vortex mixing 0.0669 g of particles of Example 28 comprising magenta dye 2 and Stabiliser 9a, 0.0671 g of dioctyl sulfosuccinate sodium salt, and 2.0972 g of dodecane.

Colour data for this dispersion is measured using the x-rite and summarised below:

TABLE 6

| L* | a* | b* | X | Y | Z | x | y |
|---|---|---|---|---|---|---|---|
| 43.98 | 60.72 | −15.42 | 24.677 | 13.822 | 22.507 | 0.405 | 0.227 |

The dispersion is allowed to stir overnight on the roller-mixer, before being further diluted in dodecane (ca. 1 drop in 2 ml) and roller-mixed overnight.

The sample is measured on the zeta sizer: Electrophoretic Mobility (−0.04391 μmcm/Vs), Zeta Potential (−47.3 mV).

Similarly prepared magenta formulations comprising particles of examples 29 and 30 are summarised below:

TABLE 7

| Ex. | Part. Ex. | Dye | L* | a* | b* | X | Y | Z | x | y |
|---|---|---|---|---|---|---|---|---|---|---|
| 34 | 29 | 2 | 47.1 | 56.97 | −14.23 | 26.993 | 16.092 | 24.971 | 0.397 | 0.236 |
| 35 | 30 | 2 | 46.41 | 56.75 | −14.05 | 26.221 | 15.574 | 24.153 | 0.398 | 0.236 |

Example 36: Colour Coordinate Measurement of an Electrophoretic Formulation Containing a Dispersion of Magenta Coloured Particles Incorporating Polymerisable Stabiliser 9b The electrophoretic ink is prepared by vortex mixing 0.1118 g of particles of Example 31 comprising magenta dye 2 and Stabiliser 9b, 0.0673 g of dioctyl sulfosuccinate sodium salt, and 2.0629 g of dodecane.

Colour data for this dispersion is measured using the x-rite and summarised below:

TABLE 8

| L* | a* | b* | X | Y | Z | x | y |
|---|---|---|---|---|---|---|---|
| 29.61 | 60.62 | −5.34 | 12.908 | 6.079 | 7.944 | 0.479 | 0.226 |

Similarly prepared formulations are made with the following particles, with the results summarised below:

TABLE 9

| Example | Particles Example | Electrophoretic Mobility (μmcm/Vs) |
|---|---|---|
| 37 | 14 | −0.04019 |
| 38 | 23 | −0.04571 |
| 39 | 28 | −0.06218 |
| 40 | 30 | −0.03739 |

The invention claimed is:

1. A polymer particle for use in electrophoretic devices comprising at least one stabiliser and monomer units of at least one monomer, optionally at least one polymerisable dye, optionally of at least one charged co-monomer, and optionally of at least one crosslinking co-monomer, wherein the stabiliser is a copolymer of methyl methacrylate, octadecyl acrylate, and at least one co-monomer, wherein the stabiliser comprises as co-monomer a (meth)acrylic acid ester of a branched alcohol.

2. The polymer particle according to claim 1, wherein the stabiliser is a block copolymer.

3. The polymer particle according to claim 1, wherein the stabiliser comprises as co-monomer ethyl hexyl acrylate.

4. The polymer particle according to claim 1, wherein the stabiliser is a block copolymer $PMMA_n$-b-P($ODA_m$-co-$EHA_p$) wherein n is the number of methyl methacrylate units, m is the number of octadecyl acrylate units, and p is the number of ethyl hexyl acrylate units and n is in the range of 5-200, m is in the range of 40-150, and p is in the range of 1-80.

5. The polymer particle according to claim 1, wherein the stabiliser comprises a polymerisable group.

6. The polymer particle according to claim 1, wherein the at least one polymerisable dye comprises a chromophore, at least one polymerisable group, optionally at least one linker group, and optionally at least one charged group.

7. A process for the preparation of the polymer particle for use in electrophoretic devices, comprising
   a) polymerising at least one monomer, at least one stabiliser, at least one initiator, optionally at least one polymerisable dye, optionally at least one charged co-monomer, and optionally at least one crosslinking co-monomer,
   b) optionally colouring the polymer particles by incorporation of at least one dye and/or at least one pre-polymerised dye and/or at least one polymerisable dye, and
   c) c) optionally washing and isolating the polymer particles, wherein the stabiliser is a copolymer of methyl methacrylate, octadecyl acrylate, and at least one co-monomer, and wherein the stabiliser comprises as co-monomer a (meth)acrylic acid ester of a branched alcohol.

8. The process according to claim 7 wherein the polymerisation is a dispersion polymerisation in at least one non-aqueous, non-polar solvent.

9. A method for the preparation of an electrophoretic fluid and a mono, bi or polychromal electrophoretic device comprising utilizing the polymer particles according to claim 1.

10. An electrophoretic fluid comprising the polymer particle according to claim 1.

11. An electrophoretic display device comprising the polymer particle according to claim 1.

12. The electrophoretic display device according to claim 11, wherein an electrophoretic fluid is applied by a technique selected from inkjet printing, slot die spraying, nozzle spraying, and flexographic printing, or any other contact or contactless printing or deposition technique.

13. A block copolymer of the formula $PMMA_n$-b-P($ODA_m$-co-$EHA_p$) wherein n is the number of methyl methacrylate units, m is the number of octadecyl acrylate units, and p is the number of ethyl hexyl acrylate units and n is in the range of 5-200, m is in the range of 40-150, and p is in the range of 1-80.

14. The block copolymer according to claim 13, wherein the block copolymer comprises a polymerisable group.

* * * * *